(12) United States Patent
Lebrun-Taugourdeau et al.

(10) Patent No.: US 12,209,938 B2
(45) Date of Patent: Jan. 28, 2025

(54) ASSEMBLY FOR CHECKING THE ATMOSPHERE PREVAILING WITHIN A FIRST ENVIRONMENT ISOLATED FROM A SECOND ENVIRONMENT

(71) Applicant: CARREFOUR DU LABORATOIRE—TECORA, Villebon-sur-Yvette (FR)

(72) Inventors: Grégoire Lebrun-Taugourdeau, Clichy (FR); Pascal Fouchard, Fontenay-Tresigny (FR)

(73) Assignee: CARREFOUR DU LABORATOIRE—TECORA, Villebon-sur-Yvette (FR)

( * ) Notice: Subject to any disclaimer, the term of this patent is extended or adjusted under 35 U.S.C. 154(b) by 336 days.

(21) Appl. No.: 17/621,308

(22) PCT Filed: Jun. 26, 2020

(86) PCT No.: PCT/EP2020/068169
§ 371 (c)(1),
(2) Date: Dec. 21, 2021

(87) PCT Pub. No.: WO2020/260672
PCT Pub. Date: Dec. 30, 2020

(65) Prior Publication Data
US 2022/0357243 A1 Nov. 10, 2022

(30) Foreign Application Priority Data

Jun. 28, 2019 (FR) ...................................... 1907206

(51) Int. Cl.
*G01N 1/18* (2006.01)
*A62B 18/08* (2006.01)
*G01N 1/24* (2006.01)

(52) U.S. Cl.
CPC .............. *G01N 1/24* (2013.01); *A62B 18/08* (2013.01)

(58) Field of Classification Search
CPC ............ G01N 1/24; G01N 2001/2276; G01N 1/2214; G01N 1/2226; G01N 1/2205;
(Continued)

(56) References Cited

U.S. PATENT DOCUMENTS 6,463,815 B1 * 10/2002 Tallentire .............. G01N 1/2205
73/863.23
6,867,413 B2 * 3/2005 Basch .................. G01N 1/2208
250/304

(Continued)

FOREIGN PATENT DOCUMENTS

EP 0311516 A1 4/1989
EP 3228289 A1 10/2017
(Continued)

OTHER PUBLICATIONS

International Search Report issued on Sep. 24, 2020 in corresponding International Application No. PCT/EP2020/068169; 5 pages (withe English Translation).

(Continued)

*Primary Examiner* — Francis C Gray
(74) *Attorney, Agent, or Firm* — Maier & Maier, PLLC (57) ABSTRACT

An assembly for checking the atmosphere within a first environment isolated from a second environment, which differs by air quality and/or composition of the atmosphere. The assembly includes an isolation element for isolating the first environment from the second environment, a sampling device to collect elements present in the atmosphere within the first environment, and a suction device. The isolation element has an item of isolating personal protective equipment, and the sampling device includes a cassette defining a compartment having an inlet orifice as the sampling orifice and an outlet orifice as the connection orifice, which can be connected to the suction device, an element for capturing the elements being researched, interposed between the two orifices, in the compartment, the cassette further having an attachment element for mounting the sampling device on the isolating personal protective equipment, and the sampling orifice opening into the isolated first environment.

30 Claims, 3 Drawing Sheets

(58) Field of Classification Search
CPC ....... A62B 18/08; A62B 18/006; A62B 19/00; A62B 27/00
See application file for complete search history.

(56) References Cited

U.S. PATENT DOCUMENTS

| | | | |
|---|---|---|---|
| 6,945,127 B2 * | 9/2005 | Van Netten | G01N 1/2273 73/863.23 |
| 2005/0136540 A1 | 6/2005 | Quine et al. | |
| 2009/0139352 A1 | 6/2009 | Shelton et al. | |
| 2017/0102297 A1 * | 4/2017 | Clavaguera | G01N 1/2208 |
| 2017/0370809 A1 * | 12/2017 | Miller-Lionberg | G01N 15/0618 |
| 2018/0306679 A1 * | 10/2018 | Sobek | G01N 1/2214 |
| 2022/0023674 A1 * | 1/2022 | Kohrman | A61M 16/208 |

FOREIGN PATENT DOCUMENTS

| | | | |
|---|---|---|---|
| EP | 3305454 A1 | 4/2018 | |
| RU | 2669318 C1 | 10/2018 | |
| WO | WO-2020240138 A1 * | 12/2020 | ........... G01N 1/2205 |

OTHER PUBLICATIONS

Search Report issued on Jan. 26, 2024, in corresponding European Application No. 20 742 656.0, 29 pages.

\* cited by examiner

ASSEMBLY FOR CHECKING THE ATMOSPHERE PREVAILING WITHIN A FIRST ENVIRONMENT ISOLATED FROM A SECOND ENVIRONMENT

FIELD

The present invention relates to an assembly for checking the atmosphere prevailing within an enclosed chamber defining a first environment isolated from a second environment that is different in terms of air quality or atmospheric composition, and particularly for checking the quality and/or composition thereof. This assembly comprises in particular a sampling device suitable for collecting elements present in the atmosphere prevailing within an enclosed chamber. Such a device is particularly suitable for making it possible to check the quality of the air in an enclosed chamber, preferably sealed, particularly an isolation personal protective equipment such as respiratory personal protective equipment. Such a device can be applied particularly advantageously in the field of asbestos removal.

BACKGROUND

In the field of collecting particles making it possible to check the quality of an environment, US-A-2009/0139352 proposes an apparatus making it possible to collect particles contained in a medication inhaler device delivering doses of medication. This collection apparatus comprises a body defining a collection chamber, a vacuum fitting removably connected to a first end of said body, said vacuum fitting having an orifice communicating with a vacuum source and having a filter arranged therein, the other end of said body being able to be connected to an inhaler, while a stirrer is mounted in said collection chamber. To perform collection, the inhaler is activated, and the vacuum source attracts the powdered product that is on the filter. The body is then disconnected from the vacuum source and from the inhaler, to receive a solution that makes it possible to dissolve the powdered product so that particles foreign to this powder are thus in suspension and can be detected using optical particle detection techniques. The body of this apparatus is used for both the collection and the analysis of the particles. This is done with the aim of checking and certifying the quality of devices for dispensing powdered medication such as inhalers.

U.S. Pat. No. 6,463,815 proposes a gas sampling device that makes it possible to take a gas sample within a sterile air supply network and test it. This sampling device comprises a sampling orifice towards a compartment that has an outlet orifice connected to a suction device, the compartment comprising a filter for gathering potential contaminants. This device makes it possible to take samples from the sterile air supply network so as to check that the filters installed in the network are performing their filtering role in a satisfactory manner. The quality of the filtering performed is thus checked.

US-A-2005/0136540 proposes a device making it possible to isolate, collect and transfer samples for detecting biological hazards, particularly in the postal mail. The letters or parcels are thus encapsulated in a sealed package before being tested. This test consists of connecting the inside of the sealed packet to a system making it possible to draw the air in the sealed packet to a filter chamber, where contaminating particles can be retained for subsequent analysis. Such a system thus makes it possible to limit the biological hazards linked to the mail, but is costly to implement.

RU-A-2669318 discloses a device for collecting particles emitted during a welding operation. This device includes a tube comprising a collection element, the tube passing through the protective mask and having one end emerging in the operator breathing zone, while the opposite end is connected to a pump. The aim is thus to recover volatile particles that might be located in the breathing zone. However, such a system does not guarantee that the air sampled is actually the air breathed by the operator, in particular due to the incorrect positioning of the system by the user.

Asbestos is a ferromagnesian silicate. The term does not denote a category or family of minerals, but groups together fibrous materials having a number of common features. Of the different fibrous rocks, six fibrous silicates are designated as "asbestos". They are set out in a regulatory framework in Directive 2009/148/EC of 30 Nov. 2009 on the protection of workers from the risks related to exposure to asbestos at work.

It is found in two main mineralogical forms: amphibole and serpentine. Exposure to asbestos fibers can originate from different sources:
  geological sources due to the natural presence of asbestos in the land,
  anthropic sources due to the presence of asbestos in installations and materials.

In both cases, asbestos fibers are released into the atmosphere by degradation of the installations and materials or by direct intervention on the different sources.

Asbestos was used extensively for more than 130 years, in different forms, for its incomparable physical and chemical properties, in particular in the construction sector, such as: fire resistance, low thermal, sound and electrical conductivity, good tensile strength, resistance to chemical attack, elasticity and flexibility.

Asbestos was also used to manufacture products as diverse as papers, cardboards, coatings, adhesives, seals, floor coverings, etc. Up to 2012, two types of product were defined:
  So-called "friable" products, such as flocking, from which the fibers detach as the material ages. They are found in some false ceilings or insulation materials (spray, lagging, etc.),
  So-called "hard" products, such as asbestos-cement, which release fibers only when sawn or drilled. These products are found in particular in the form of ducts, boards or roofing elements.

Since 1997 (Decree No. 96-1133 of 24 December), the manufacturing, processing, importing, placing on the domestic market, exporting, and transfer, even free of charge, of all types of asbestos fiber, whether or not incorporated into materials, have been prohibited in France.

It is now recognized that all varieties of asbestos are carcinogenic. However, inhalation of asbestos dust can also cause impairments of the respiratory functions (pleural plaques, asbestosis or pulmonary fibrosis). These pathologies can appear many years after the exposure period, although no health effect threshold can be determined in humans for asbestos fibers of any type or dimensions.

It is therefore necessary to be able to remove asbestos from installations that pose an asbestos hazard and, to this end, to perform these asbestos removal operations in the most optimal safety conditions for the operators.

Some of these sites are potentially very emittive, which makes it necessary to guarantee the safety of the operators. To this end, the operators use isolating personal Respiratory Protective Equipment (RPE) supplied with breathable air. Such equipment, when worn by the user, therefore defines an enclosed chamber sealed from the surrounding environment, in which the air must be kept healthy.

Conventionally, and in order to guarantee a healthy, safe working environment for the operators involved, ambient air sampling instruments are therefore used that make it possible to assess the asbestos hazard in order to define and provide the most appropriate respiratory protective equipment. The presence of asbestos in the atmosphere of the site on which the operator wearing RPE such as a mask will be located is thus measured, and their exposure is calculated using a sealing factor of the mask.

However, a study carried out by the INRS (the French National Research and Safety Institute) concluded that there was a significant difference between the exposure calculated using this method and a method of directly measuring the asbestos concentration in the environment of the mask.

It appears that the current asbestos hazard assessment takes into account the polluted environment, but does not make it possible to define, with certainty, a user's exposure in operating conditions.

SUMMARY

The aim of the present invention is therefore to propose an assembly for checking the isolated atmosphere in which an operator moves around with respect to a polluted environment, for example, comprising a sampling device suitable for recovering elements present in this isolated environment such as the inside of isolation personal protective equipment worn by a user.

To this end, the invention relates to an assembly for checking the atmosphere prevailing within a first environment isolated from a second environment that is different in terms of air quality and/or atmospheric composition, said assembly comprising in particular isolation means isolating said first environment from the second environment, a sampling device suitable for collecting elements present in the atmosphere prevailing within the first environment, and a suction device, characterized in that the isolation means consist of isolation personal protective equipment and the sampling device comprises a cassette defining a compartment that has a so-called sampling inlet orifice and a so-called connecting outlet orifice that can be connected to the suction device, means for retaining the elements the presence and/or concentration of which is sought being housed in the compartment, interposed between the two orifices, the cassette further including fastening means configured to mount the sampling device on the isolation personal protective equipment, which has complementary fastening means, with the sampling inlet orifice of said sampling device emerging into the isolated first environment.

The invention thus also relates to a sampling device suitable for collecting elements present in the atmosphere prevailing within a first environment isolated from a second environment, characterized in that it comprises a cassette defining a compartment that has a so-called sampling inlet orifice and a so-called connecting outlet orifice that can be connected to a suction device, means for retaining the elements the presence and/or concentration of which is sought being housed in the compartment, interposed between the two orifices, the cassette further including fastening means configured to mount the device with its sampling inlet orifice emerging into the isolated environment.

The device according to the invention can thus advantageously be mounted with its sampling end emerging into the isolated environment in order to sample the atmosphere prevailing and therein collect sought elements that might be present therein, from the external environment, without disturbing the isolation of the isolated environment tested.

This environment is thus isolated from a second environment by appropriate isolation or separation means and can be located, for example, within an enclosed chamber isolating the atmosphere prevailing therein from the surrounding atmosphere, the device being mounted on the chamber to make it possible to sample the isolated atmosphere without breaching the isolation thereof, and preferably without any need to fully enter said chamber.

It is thus possible to sample, within an environment kept enclosed and isolated, for example for safety reasons, from an environment that is different in terms of air quality or atmospheric composition, for example polluted and/or contaminated with hazardous substances or having an unbreathable chemical composition, the atmosphere prevailing therein, to check that this atmosphere remains healthy, without breaching the separation between the two environments or milieux.

These separation means can be a respiratory isolation mask. Once the sample has been taken, the device is removed and the retention means are recovered for analysis. Preferably, therefore includes means for fastening to the isolation or separation means defining the isolated environment that therefore make it possible to mount and remove the device without damaging said means.

An assembly according to the invention is thus particularly advantageous for checking the air prevailing in isolation personal protective equipment (PPE) such as respiratory protective equipment (RPE) used in working environments that are hazardous to operators. The inside of the RPE thus used constitutes the environment isolated from the external working environment.

The invention therefore also relates to a sampling device suitable for recovering elements in the air prevailing within isolation personal protective equipment such as respiratory protective equipment, comprising: a cassette including a compartment, a so-called sampling inlet orifice and a so-called connecting outlet orifice that can be connected to a suction device, means for retaining the elements the presence and/or concentration of which is sought being housed in the compartment, interposed between the two orifices, the cassette including fastening means configured to preferably sealably mount the cassette on the isolation personal protective equipment with the sampling inlet orifice emerging into the air prevailing within said equipment.

Advantageously, when the sampling device according to the invention is installed in RPE such as a respiratory isolation mask worn by a user, defining for the user an enclosed chamber sealed from the external environment and containing breathable air, it makes it possible to sample the air prevailing within the mask through its sampling inlet orifice, using a suction device to which it is connected by its connecting outlet orifice, the air passing through the compartment and the retention means interposed between the two openings. The elements sought can thus be captured by the retention means and once the user has finished using the RPE, the sampling cassette, and therefore the retention means, can be recovered and checked for the presence of the sought elements, and the concentration thereof can be determined if applicable.

The sampling device of an assembly according to the invention therefore takes the form of a device that can be installed in personal protective equipment PPE such as isolating respiratory protective equipment RPE, through thereof, so that its sampling inlet orifice emerges into the atmosphere to be studied, the fastening means of the device being arranged to allow its sealed installation and subsequent removal to allow the collection of the retention means, the analysis thereof and the storage thereof in archives, thus making it possible to keep a record of the health conditions of the work carried out.

Advantageously, such a device can be installed in a class III (serious or fatal hazard) respiratory protection mask for operators working in an environment involving hazards such as an asbestos hazard. To this end, the compartment of the cassette is further sealed so as to also prevent contaminants such as the captured asbestos fibers from being dispersed when the device is recovered for analysis.

In the context of specific use for the asbestos hazard on mask/suit RPE, the device according to the invention makes it possible to take a sample from the air contained in the mask, that is, the air that the user of the mask is breathing, the chamber being delimited in particular by the inner face of the mask. It is thus possible to directly check the asbestos fiber content for example inside the mask, in a working situation, by sampling the air inside the mask during use.

Such a device advantageously makes it possible to guarantee the safety of the operators. The air sampled is thus directly the air present inside the mask and inhaled by the user of the mask.

Such a sampling device can be used in all environments defined by PPE in which the presence or absence of polluting, hazardous or other substances is to be checked. It can therefore be envisaged that this PPE is an all-in-one isolation suit for protecting against biological, chemical, etc. hazards, the device being installed in the respiratory mask portion of the suit.

Advantageously, the means for retaining or trapping the elements sought are selected as a function of the type of elements sought, which can be fibers, particles, fine particulate matter, heavy metals (As, Cd, Cr, Cu, Hg, Ni, Pb, Se, Zn, etc.), persistent organic pollutants (POP) such as dioxins and furans, gaseous pollutants such as benzene, toluene, ammonia, sulfur oxides, nitrogen oxides, or volatile organic compounds (VOC), wherein this list is not exhaustive.

The retention means are thus selected from filters, sampling tubes, or sampling cartridges including adsorbents such as activated carbon, black carbon graphite, porous polymer, silica gels and any other appropriate retaining/trapping means as a function of the elements to be trapped.

According to a preferred embodiment, the cassette comprises a base in the form of a tubular cylindrical body defining the compartment in which are housed means for retaining elements the concentration of which in the sampled atmosphere is sought, said body having two open opposite ends, one end forming the sampling inlet orifice and the opposite end forming the connecting outlet orifice, the retention means being housed in the compartment, interposed between the two orifices.

Preferably, in the case of the use of RPE in the context f an asbestos hazard, the cassette includes, as retention means, a filter for asbestos fibers and a filter holder. Preferably, a mixed cellulose ester (MCE) membrane filter is used, made up of pure and biologically inert mixtures of cellulose acetate and cellulose nitrate. MCE membranes are naturally low in metal and are compatible with dilute bases and acids and aromatic and aliphatic hydrocarbons. MCE filters are hydrophilic and autoclavable, and are particularly suitable for capturing and then analyzing asbestos fibers. The filter holder is preferably a cellulose pad holder.

According to a preferred embodiment, the base includes a first portion having a given diameter and a second portion having a smaller diameter than the first portion.

At the junction between the two portions of the base is a shoulder against which retention means such as a filter are housed, on which a filter holder is then positioned. If no shoulder is formed in the base, fastening means for the retention means can be provided.

The open end of the portion with a smaller diameter forms the sampling inlet orifice and is arranged to be fastened to separating means between the environments such as the mask, and thus to emerge into the atmosphere prevailing inside said mask when it is worn by a user.

The end of the portion with a larger diameter is the end forming the connecting outlet orifice suitable for being connected to a suction device P such as a pump using connecting means.

Once the cassette has been installed on a mask and connected to an operating pump, the air present in the mask is thus sampled through the sampling cassette, the air entering the cassette by the sampling inlet orifice, passing through the retention means such as the filter, which thus retain the elements sought if they are present, and leaving the base by the connecting outlet orifice to the pump.

Preferably, the connecting outlet orifice of the base has a cover sealably fastened to said base. This cover consists of a disk having the same diameter as the connecting end of the base and provided with a central orifice in which an element for connection to a suction device is mounted.

This connecting element is preferably a gland fitting allowing the sealed fastening of the end of a hose, preferably flexible, the other end of which is connected to the suction pump. Before use, the connecting element has a closure plug.

The cover is sealably fastened to the connecting end of the base. Preferably, the cover and the connecting end of the base have to this end complementary fastening means, such as screwing means, making possible sealed fastening due to the tightening torque.

The sampling device thus advantageously has features that allow it to have the mechanical properties required by the PPE approval tests, particularly regarding tensile strength, and also to avoid the presence of gaps or slits in which the asbestos dust could become lodged and contaminate the exterior of the sites.

The sampling inlet orifice of the base has means for fastening to a fastening orifice formed on the mask, which has complementary fastening means. These fastening means of the mask consist of a fastening ring through which the sampling inlet orifice of the device is engaged in order to emerge on the inner face of the mask. Preferably, the fastening means consist of screwing means provided on the base on the sampling inlet orifice side and the fastening ring provided in the mask is provided with complementary screwing means making it possible to sealably mount the cassette on the mask and then remove it therefrom.

These fastening means are preferably complementary screwing means such as an internal thread formed inside the fastening ring of the mask, complementing an external thread formed on the outer face of the sampling end of the cassette. The screw pitch is a dedicated pitch, in particular to avoid the mounting of a non-compliant device, preventing the positioning of an unsuitable device. A gasket is further placed between the base and the fastening ring in order to guarantee sealed mounting of the sampling device on the mask. The device according to the invention can thus be fastened sealably and cleanly to the equipment without any risk of damaging or deforming it.

Very advantageously, in order to allow improved checking of the environmental safety of the operators on these asbestos removal sites, the quality of the air located directly inside this PPE is measured, providing assurance that the operators using it are safe. By sampling the air inside a protective mask of an asbestos removal operator during the use thereof, the quality of the air present in the respiratory protective equipment in use can thus be checked, and on this basis of this check, the performance of said equipment can be validated or invalidated.

A solution is thus provided for efficiently trapping the fibers suspended in the air inside the mask so that the exposure of individuals breathing in an isolated environment but moving around in a contaminated environment can be assessed. Until now, the presence of the pollutant in the atmosphere in which the individual wearing the mask is located was measured, and their exposure calculated using a sealing factor of the mask. With this device of the assembly, the actual direct exposure of the user of the RPE is measured, more simply, quickly and accurately as there are no longer any factors to be extrapolated. The assembly according to the invention makes it possible to measure exposure to chemical pollutants, for example, in protective masks.

The assembly according to the invention is made so that once the sampling device has been installed in the RPE, it is sealed, which makes it possible, on sites with an asbestos or other hazard, for the operator to be decontaminated by shower in particular at the end of operations, without losing the analytical features of the device. As the cassette compartment is sealed, the sample is protected despite the shower or other decontamination methods used.

In addition, as the device is sealed, it cannot be a vehicle for contaminating the exterior of the site as it does not have any folds or slits that could retain asbestos dust.

The device is in particular made from a material having the appropriate anti-static properties, such as carbon-loaded polyethylene, which prevents the asbestos fibers from sticking to the walls of the cassette and distorting the result. This material also has appropriate mechanical properties for tensile strength and fire resistance testing.

Advantageously, a sampling device of the assembly according to the invention meets the requirements of the class III PPE validation tests: fire, tensile strength, pull-off strength, etc., and the usability thereof does not hinder or pose a hazard to the user, being compatible with the PPE to which it will be fastened.

A sampling device of the assembly according to the invention thus advantageously forms an advantageous analysis medium in terms of appropriate purity and traceability, which has appropriate anti-static properties for use in an asbestos hazard environment, offering in particular very good protection of the sample gathered.

The invention also relates to a sampling assembly, suitable for collecting elements present in the atmosphere prevailing within an isolated environment, comprising a sampling device according to the invention and a suction pump connected to said device by a flexible hose mounted on the connecting outlet orifice of said device.

So as to allow the handling of the sampling device, it further includes tools such as two wrenches, one making it possible to screw/unscrew the connecting element and the flexible hose, the other making it possible to open the compartment by unscrewing the cover to collect the retention means. The cover can thus have an indentation formed in the mass of the cover. Preferably, these two wrenches are provided on the same handle. Another tool can be a case in which the cassette can be housed with its connecting outlet orifice protruding from said case, so as to promote the removal of the cassette in complete safety.

The invention also relates to a method for checking the quality and/or the composition of the atmosphere prevailing within isolation personal protective equipment such a respiratory protective equipment (RPE) defining in said equipment a first environment (F) isolated from a second environment(S) that is different in terms of air quality or atmospheric composition, characterized by the following steps:

a sampling device comprising a cassette defining a compartment that has a so-called sampling inlet orifice and a so-called connecting outlet orifice that can be connected to suction device (P) is mounted on the isolation means of the personal protective equipment, said device being mounted with its sampling inlet orifice emerging into the first environment (F), the suction device is activated in order to sample the atmosphere within the first environment (F), which passes through the sampling device, which includes means for retaining the elements the presence and/or concentration of which is sought, housed in the compartment, interposed between the sampling inlet orifice and the connecting outlet orifice, the sampling device is then removed and the retention means are recovered from the device in order to carry out an analysis of the elements recovered from said retention means.

Advantageously, the method makes it possible to collect, within an environment kept enclosed and isolated, for example for safety reasons, from an environment that is different in terms of air quality and/or atmospheric composition, for example polluted and/or contaminated with hazardous substances or having an unbreathable chemical composition, the atmosphere prevailing therein, to check that this atmosphere remains healthy, without breaching the separation between the two environments or milieux, such as a respiratory isolation mask, during the use of the mask. The method is implemented using an assembly according to the invention, which comprises the isolation personal protective equipment such as respiratory protective equipment (RPE) defining the first environment (F) isolated from a second environment (S) that is different in terms of air quality or atmospheric composition, and the sampling device suitable for collecting elements present in the atmosphere prevailing within the first environment (F) defined by said protective equipment, as well as a suction device. Once the sample has been taken, the device is removed from the personal protective equipment and the retention means are recovered for analysis.

Preferably, the retention means are stored in archives.

BRIEF DESCRIPTION OF THE DRAWINGS

The invention will now be described in more detail with reference to the figures, which show.

DETAILED DESCRIPTION

Figure 1:
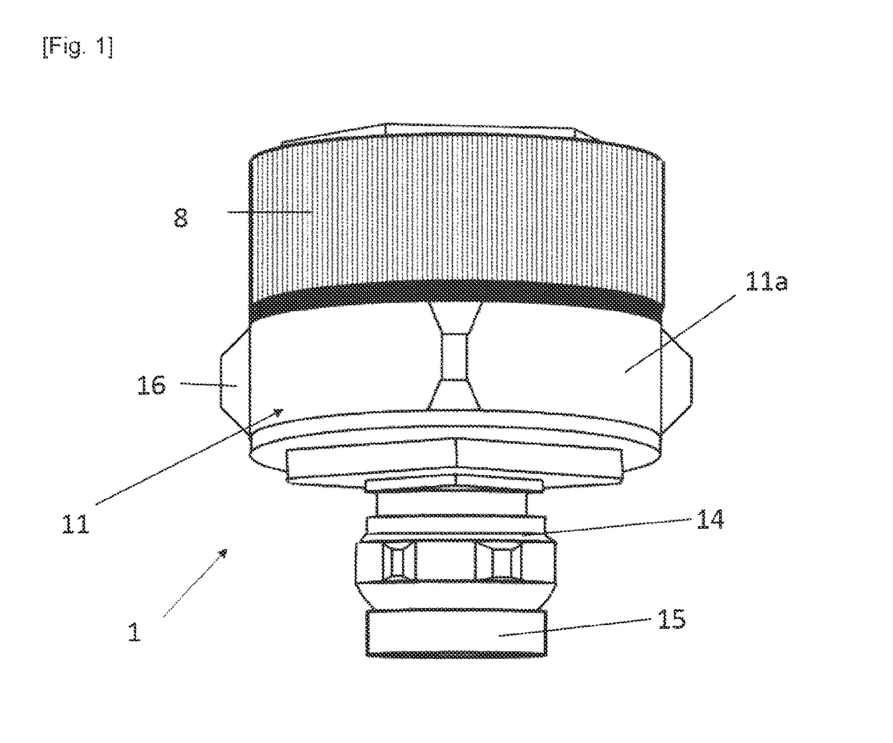
FIG. 1 a perspective view of a first exemplary embodiment of a sampling device of an assembly according to the invention.
Figure 2:
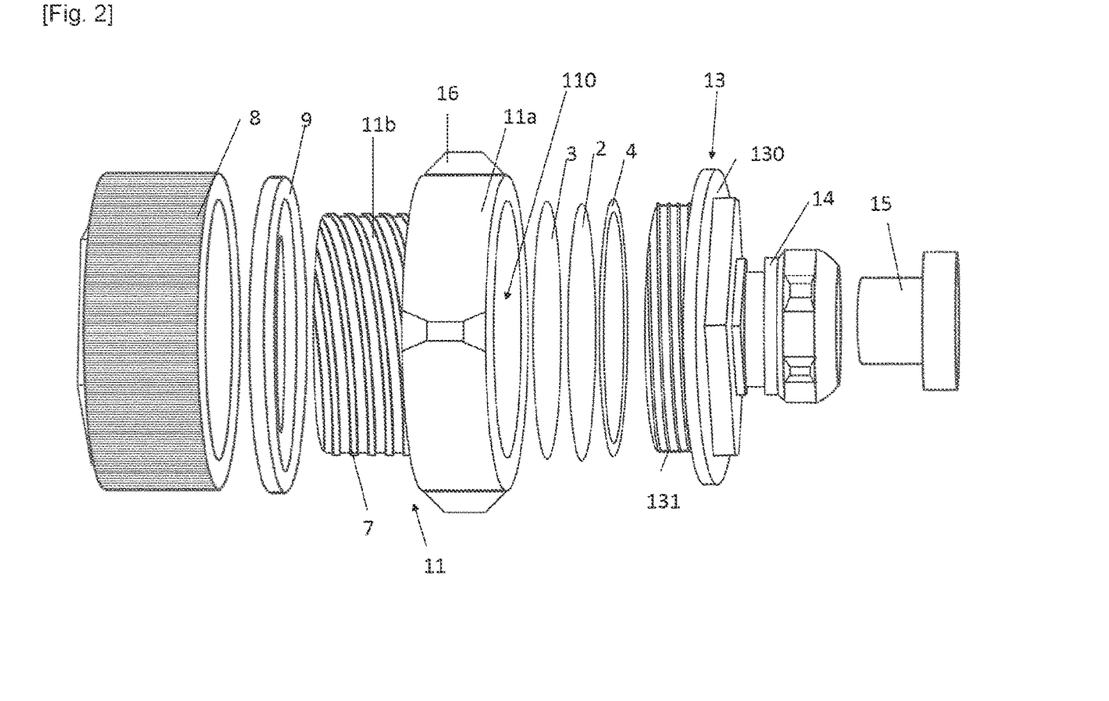
FIG. 2 an exploded perspective view of the device in FIG. 1.
Figure 3:
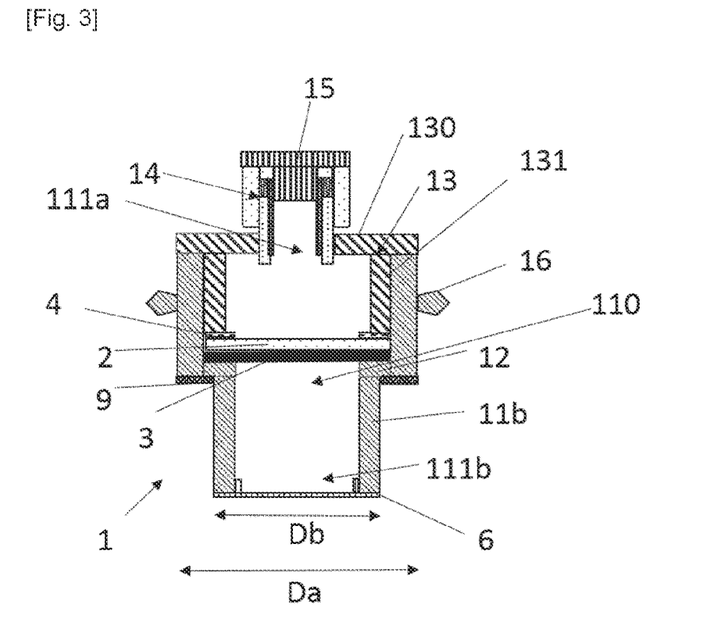
FIG. 3 a cross-sectional view of a device according to FIG. 1.

The sampling device 1 according to the invention, also referred to as a sampling cassette, takes the form of a cassette that can be installed in personal protective equipment PPE such as isolating respiratory protective equipment RPE. In the example described here, such a device can be installed in a class III (serious or fatal hazard) respiratory protection mask for operators working in an environment involving an asbestos hazard.

Figure 5:
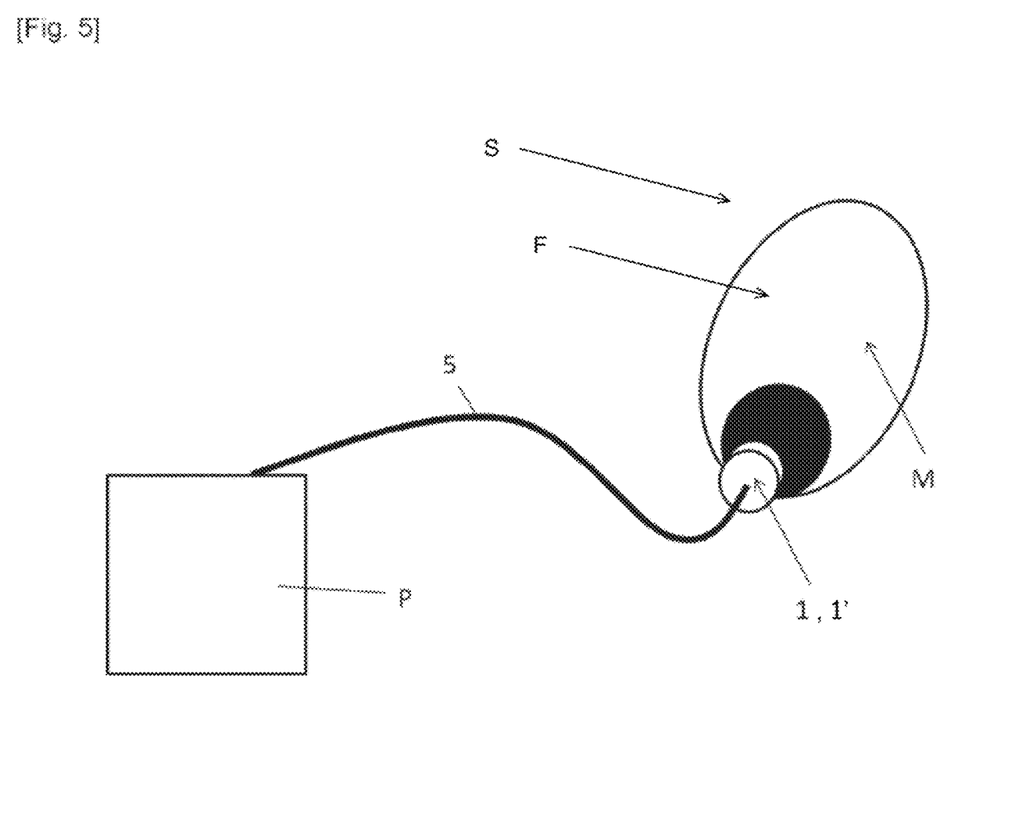
FIG. 5 a block diagram of an assembly according to the invention in use.

This device 1 thus installed in the respiratory protection mask M makes it possible to take a sample from the air contained in the mask M, that is, the air that the user of the mask M is breathing, which forms an environment sealably from isolated the external environment. It is thus possible to directly check the asbestos fiber content inside the mask M, in a working situation, by sampling the air inside the mask M during use in a polluted, hazardous working environment without breaching the isolation of the air contained in the mask M.

Such a device 1 is used to guarantee the safety of the operators. The air sampled is thus directly the air present inside the mask M and inhaled by the user of the mask M, originating from an air source and/or from the external environment, and which has been filtered appropriately.

The device takes the form of a cassette 1 including a base 11, in the form of a tubular cylindrical body open at its two ends. The space inside this base 11 defines the compartment 110 of the device 1 in which are housed a filter holder 2 and a filter 3 as retention means for collecting asbestos fibers.

Preferably, a mixed cellulose ester (MCE) membrane filter 3 is used, made up of pure and biologically inert mixtures of cellulose acetate and cellulose nitrate. MCE filters are hydrophilic and autoclavable, and are particularly suitable for capturing and then analyzing asbestos fibers.

The body or base 11 has a first portion 11a having a diameter Da and a second portion 11b having a diameter Db smaller than Da. The body 11 thus has two open opposite ends, one on the portion 11a side and one on the portion 11b side.

At the junction between the two portions 11a and 11b of the base 11 there is a shoulder 12 against which the filter 3 is housed, on which the filter holder 2 is then positioned.

The portion 11b side end has an inlet orifice into the compartment referred to as the sampling inlet orifice 111b, this so-called sampling end 11b is arranged to be fastened to the mask M so that the sampling inlet orifice 111b emerges into the atmosphere prevailing inside said mask M when it is worn by a user.

The opposite portion 11a side end is referred to as the connecting end 11a and forms the connecting outlet orifice 111a suitable for being connected to a suction device P such as a pump.

The use of the pump P thus makes it possible to sample the air present in the mask M through the sampling cassette, the air entering the cassette by the sampling inlet orifice 111b, passing through the filter 3 and leaving the base 11 by the connecting outlet orifice 111a to the pump P.

To this end, the portion 11a side end of the body 11 has a cover 13 sealably fastened to said body 11. This cover 13 consists of a disk 130 provided with a central orifice in which an element 14 for connection to the suction device P is mounted.

This connecting element 14 is preferably a gland fitting allowing the sealed fastening of the end of a hose 5, preferably flexible, the other end of which is connected to the suction pump P. Before use of the device on RPE, the connecting element 14 has a closure plug 15, maintaining the sealing of the device 1 before and after use.

The cover 13 is sealably fastened to the connecting end 11a of the base 11. Preferably, the cover 13 and the connecting end 11a have complementary fastening means, such as screwing means.

The cover 13 thus has a skirt 131 formed protruding from the disk 130 and provided on its outer face with an external thread suitable for interacting with an internal thread formed on the inner face of the connecting end 11a of the base 11.

In order to guarantee the sealed mounting of the cover 13 on the base 11, a gasket 4 is positioned on the filter holder 2, the end of the skirt 131 of the cover 13 pressing on said gasket 4 when it is screwed on, the end of the base 11 pressing against the cover 13. The cover has a disk 130 the diameter of which corresponds to the outer diameter of the base 11, the cover 13 aligning with the base 11 and the tightening ensuring that there is no slit between the base 11 and the cover 13. Preferably, a seal is affixed to the intersection between the base and the cover to guarantee that the cassette thus formed has never been used. This seal will only be broken when, after use, the retention means contained in the compartment 110 are extracted for analysis.

The sampling end 11b of the body 11 has means for fastening to an orifice formed on the mask M.

Preferably, the orifice of the mask M is provided with a fastening ring through which the sampling end 11b of the device 1 is engaged towards the inside of the mask M when it is worn by a user.

The fastening ring includes fastening means that complement fastening means provided on the sampling end 11b of the base 11. These fastening means are preferably complementary screwing means such as an internal thread formed inside the fastening ring of the mask M, complementing an external thread 7 formed on the outer face of the portion 11b of the body 11. A gasket 9 is further placed between the base 11 and the fastening ring in order to guarantee sealed mounting of the sampling device on the mask M.

These screwing means also make it possible to place a plug 8 on the sampling end 11b of the base 11, closing this end when the sampling device is not in use. The gasket 9 is also present between the plug 8 and the base 11 so as to guarantee the sealing of the device 1. As a variant, an element for closing the end in the form of a cap 6 having a skirt that can be engaged in the sampling end 11b can be proposed.

To secure the mounting of the cartridge on the mask M, the base 11 has on its outer face protruding ridges 16 making it possible to rotate the device 1 in order to screw it onto the fastening ring.

So as to allow appropriate use of the sampling device 1 according to the invention, a seal is placed where the cover 13 is mounted on the base 11, which guarantees, when it is installed on a mask M for use, the integrity of the cassette 1, in particular the sealing of the compartment 110, and therefore as a result the effectiveness and reliability thereof with respect to the expected results. It is thus guaranteed that the retention means contained in the cassette 1 are pure and ready to use.

Figure 4:
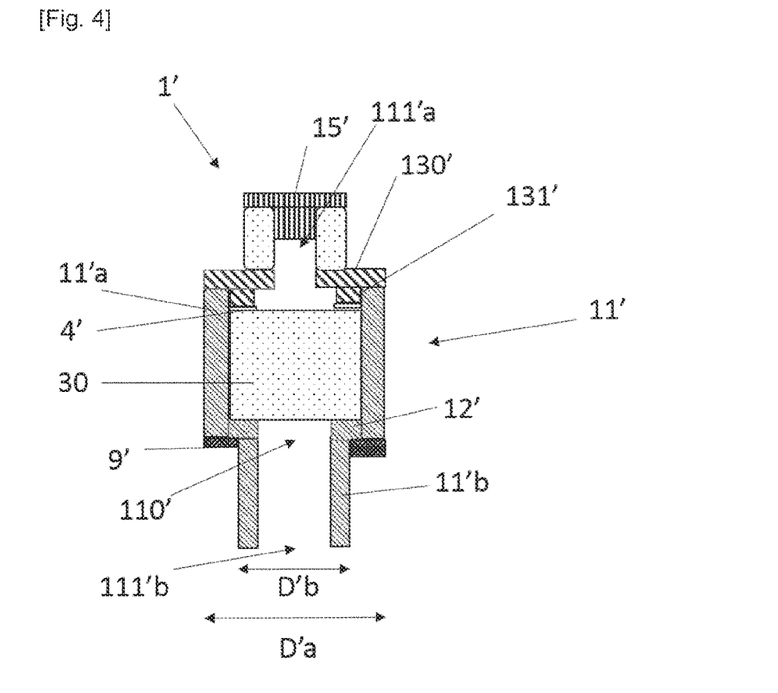
FIG. 4 a cross-sectional view of a second exemplary embodiment of a device according to the invention.

FIG. 4 shows a second exemplary embodiment of a device 1' according to the invention, having a base 11' defining a compartment 110'. On the shoulder 12' formed by the two portions 11'a and 11'b of the base 11' with diameters Da' and Db', where Db'<Da', a cartridge of porous material 30 is put in place as means for retaining or trapping the elements sought. The cover 13' is put in place with its threaded skirt 131' and its disk 130' on the connecting end 11', the end of the skirt 131' sealably pressing on a gasket 4' fitted on the cartridge 30. The connecting outlet orifice 111'a includes a gland fitting 14' provided with a closure plug 15'. The base 11' also includes ridges 16' making it possible in particular to mount the device 1' by its sampling inlet orifice 111'b on a mask.

An example will now be described of the use of an assembly according to the invention including a sampling device, with isolating respiratory protective equipment M that thus makes it possible to take measurements of the concentration of asbestos fibers inside the mask M in a working situation by sampling air, for example at a flow rate of between 7 and 10 l/minute.

The mask M is specifically designed to make it possible to take samples of the air present inside the mask and directly inhaled by the user. To this end, it therefore has an orifice making it possible to put in place the sampling device according to the invention. The cassette and the mask M are prepared.

Before installing the cassette, the seal is checked to ensure that it is not damaged. The cassette 1 includes the respective closure elements 8, 15 on the sampling inlet orifice and the connecting outlet orifice.

The presence of the gasket 9 and the general good condition of the cassette and of said gasket 9 are also checked. The cassette 1 must be removed from its packaging and installed on the mask M in a clean, uncontaminated area.

The plug 15 is then removed from the cassette 1 on the connecting outlet orifice side and the suction hose 5 is connected. The end of the hose provided with a metal insert is inserted into the gland 14 up to the stop. The gland 14 is then tightened up to the stop using a specific wrench supplied with the device.

The plug is then removed from the mask M and the plug 8 on the sampling inlet orifice side of the base 11 is removed. This end is screwed manually onto the mask M using only the ridges 16 provided to this end on the cassette. It is tightened so as to compress the gasket 9 to ensure the sealed mounting.

Once the user is dressed, in accordance with the regulations in force, the hose 5 can be slid into the loops of a harness worn by the operator and clipped to the breathable air hose supplying the mask M using two clips supplied with the sampling device.

The suction pump P is then installed using a harness and connected to the sampling hose 5. Thus equipped, the operator can then enter the contaminated site. The use of the mask provided with the sampling cassette is identical to that of a normal mask. The operation or stopping of the air sampling pump does not have any impact on its use.

However, some precautions should be taken, such as not handling, unscrewing or removing the cassette under any circumstances when the atmosphere cannot be breathed in without danger.

In order to make sampling safe, in addition to the usual decontamination procedure, the following procedural instructions should be followed:

The connecting hose 5 must be closed off if the pump P is removed before entry into the shower decontamination facilities.

When the mask M is removed, the shower is switched off, the sampling hose 5 is separated from the harness, and the air intake valve of the mask M is closed before it is removed by raising the head.

The mask M provided with the cassette 1 and the connecting hose 5 are handed to the person responsible for managing the cassettes, holding the sampling opening of the cassette 1 facing downwards until it is removed from the mask. Particular care should also be taken not to wet the inside of the mask at this time.

It is imperative that the person responsible for managing the sampling cassettes:

Dries the mask, the cassette 1 and the hose 5 thoroughly using paper towel.

Unscrews the cassette 1 from the mask M, handling only the ridges 16 and keeping the sampling opening 111b thus liberated facing downwards, and then closes the opening 111b with the correct plug 8.

Disconnects the hose 5 from the cassette 1 by loosening the gland fitting 14 using the wrenches supplied, and then closes the gland fitting 14 with the upper plug 15 of the cassette 1.

Returns the mask M to the user for completion of the cleaning and maintenance operations.

The cassette 1 with the potentially contaminated filter 3 is thus recovered and sent for handling by an accredited laboratory, for analysis and possible archiving.

The cassette 1 is inserted for example into a dismantling case and the laboratory recovers the filter 3 by unscrewing the cover 13 (which breaks the seal), holding the cassette 1 with the connecting outlet orifice and its cover 13 upwards so that the filter 3 does not fall out. The potentially contaminated cassette 1 is then removed. The cassettes according to the invention are preferably single-use.

The invention claimed is:

1. An assembly for checking the atmosphere prevailing within a first environment isolated from a second environment that is different in terms of air quality and/or atmospheric composition, said assembly comprising:
   an isolation personal protective equipment defining for a user an enclosed and isolated chamber isolating said first environment from the second environment,
   a sampling device suitable for collecting elements present in the atmosphere prevailing within the first environment, and
   a suction device,
   wherein the sampling device comprises a cassette defining a compartment that has a sampling inlet orifice and a connecting outlet orifice configured to be connected to the suction device, means for retaining the elements the presence and/or concentration of which is sought being housed in the compartment, interposed between the two orifices, the cassette further including fastening means configured to mount the sampling device on the isolation personal protective equipment, which has complementary fastening means, with the sampling orifice of said sampling device emerging into said isolated first environment, the compartment of the cassette being sealed in view of the second environment.

2. The assembly as claimed in claim 1, wherein that the retention means are selected as a function of the type of elements sought and are selected from filters and sampling tubes, said filters and said sampling tubes including adsorbents selected from the group consisting of activated carbon, black carbon graphite, porous polymer, and silica gels.

3. The assembly as claimed in claim 1, wherein the cassette comprises a base in the form of a tubular cylindrical body defining the compartment in which are housed the retention means, said body having two open opposite ends, one end forming the sampling inlet orifice and the opposite end forming the connecting outlet orifice, the retaining means being housed in the compartment, interposed between the two orifices.

4. The assembly as claimed in claim 3, wherein the base includes a first portion having a given diameter Da and a second portion having a diameter Db smaller than the diameter Da of the first portion, a shoulder being formed at the join between the two portions of the base against which is housed a disk-shaped filter as retention means.

5. The assembly as claimed in claim 3, wherein the open end of the portion with a smaller diameter forms the sampling inlet orifice and is arranged to be fastened to separating means between the environments and the end of the portion with a larger diameter is the end forming the connecting outlet orifice suitable for being connected to the suction device using connecting means provided on said connecting outlet orifice.

6. The assembly as claimed in claim 3, wherein the connecting orifice of the base has a cover sealably fastened to said base and provided with a central orifice in which an element for connection to a suction device is mounted.

7. The assembly as claimed in claim 6, wherein the connecting element is a gland fitting allowing the sealed fastening of one end of a hose, preferably flexible, the other end of which is connected to a suction device.

8. The assembly as claimed in claim 6, wherein the cover is sealably fastened to the connecting end of the base, the cover and the connecting end of the base having complementary fastening means, making possible sealed fastening due to the tightening torque.

9. The assembly as claimed in claim 1, wherein the isolation personal protective equipment is a respiratory protective equipment (RPE) comprising a mask (M).

10. The assembly as claimed in claim 1, wherein the isolation personal protective equipment is an all-in-one isolation suit protecting against biological and chemical hazards, comprising a respiratory mask portion.

11. The assembly as claimed in claim 9, wherein the sampling inlet orifice of the base has means for fastening to an orifice made in the mask M of the RPE, said orifice made in the mask M of the RPE having complementary fastening means for achieving sealed mounting.

12. A method for checking the quality and/or composition of the atmosphere prevailing within isolation personal protective equipment defining in said equipment a first environment isolated from a second environment that is different in terms of air quality and/or atmospheric composition, comprising the following steps:
a sampling device comprising a cassette defining a compartment that has a sampling inlet orifice and a connecting outlet orifice that can be connected to suction device is mounted on the isolation personal protective equipment, said device being mounted with its sampling inlet orifice emerging into the first environment,
the suction device are activated in order to sample the atmosphere within the first environment, which passes through the sampling device, which includes means for retaining the elements the presence and/or concentration of which is sought, housed in the compartment, interposed between the sampling inlet orifice and the connecting outlet orifice, and
the sampling device is then removed and the retention means are recovered from the device in order to carry out an analysis of the elements recovered from said retention means.

13. The method as claimed in claim 12, wherein the retaining means are stored in archives.

14. An assembly for checking the atmosphere prevailing within a first environment isolated from a second environment that is different in terms of air quality and/or atmospheric composition, said assembly comprising:
an isolation personal protective equipment isolating said first environment from the second environment;
a sampling device suitable for collecting elements present in the atmosphere prevailing within the first environment; and
a suction device,
wherein the sampling device comprises a cassette defining a compartment that has a sampling inlet orifice and a connecting outlet orifice that can be connected to the suction device, means for retaining the elements the presence and/or concentration of which is sought being housed in the compartment, interposed between the two orifices, the cassette further including fastening means configured to mount the sampling device on the isolation personal protective equipment, which has complementary fastening means, with the sampling inlet orifice of said sampling device emerging into said isolated first environment, the cassette comprising a base in the form of a tubular cylindrical body defining the compartment in which is housed the retention means, said body having two open opposite ends, one end forming the sampling inlet orifice and the opposite end forming the connecting outlet orifice, the retaining means being housed in the compartment, interposed between the two orifices, wherein the base includes a first portion having a given diameter Da and a second portion having a diameter Db smaller than the diameter Da of the first portion, a shoulder being formed at the join between the two portions of the base against which is housed a disk-shaped filter as retention means.

15. The assembly as claimed in claim 14, wherein the open end of the portion with a smaller diameter forms the sampling inlet orifice and is arranged to be fastened to separating means between the environments and the end of the portion with a larger diameter is the end forming the connecting outlet orifice suitable for being connected to the suction device using connecting means provided on said orifice.

16. An assembly for checking the atmosphere prevailing within a first environment isolated from a second environment that is different in terms of air quality and/or atmospheric composition, said assembly comprising:
an isolation personal protective equipment isolating said first environment from the second environment;
a sampling device suitable for collecting elements present in the atmosphere prevailing within the first environment; and
a suction device,
wherein the sampling device comprises a cassette defining a compartment that has a sampling inlet orifice and a connecting outlet orifice that can be connected to the suction device, means for retaining the elements the presence and/or concentration of which is sought being housed in the compartment, interposed between the two orifices, the cassette further including fastening means configured to mount the sampling device on the isolation personal protective equipment, which has complementary fastening means, with the sampling inlet orifice of said sampling device emerging into said isolated first environment, the cassette comprising a base in the form of a tubular cylindrical body defining the compartment in which are housed the retention means, said body having two open opposite ends, one end forming the sampling inlet orifice and the opposite end forming the connecting outlet orifice, the retaining means being housed in the compartment, interposed between the two orifices, wherein the connecting outlet orifice of the base has a cover sealably fastened to said base and provided with a central orifice in which an element for connection to a suction device is mounted.

17. The assembly as claimed in claim 16, wherein the connecting element is a gland fitting allowing the sealed fastening of one end of a hose, the other end of which is connected to the suction device.

18. The assembly as claimed in claim 16, wherein the cover is sealably fastened to the connecting end of the base, the cover and the connecting end of the base having complementary fastening means making possible sealed fastening due to the tightening torque.

19. An assembly for checking the atmosphere prevailing within a first environment isolated from a second environment that is different in terms of air quality and/or atmospheric composition, said assembly comprising:
   an isolation personal protective equipment isolating said first environment from the second environment;
   a sampling device suitable for collecting elements present in the atmosphere prevailing within the first environment; and
   a suction device,
   wherein the sampling device comprises a cassette defining a compartment that has a sampling inlet orifice and a connecting outlet orifice that can be connected to the suction device, means for retaining the elements the presence and/or concentration of which is sought being housed in the compartment, interposed between the two orifices, the cassette further including fastening means configured to mount the sampling device on the isolation personal protective equipment, which has complementary fastening means, with the sampling orifice of said sampling device emerging into said isolated first environment, and
   wherein the isolation personal protective equipment is a respiratory protective equipment (RPE) comprising a mask (M).

20. An assembly for checking the atmosphere prevailing within a first environment isolated from a second environment that is different in terms of air quality and/or atmospheric composition, said assembly comprising:
   an isolation personal protective equipment isolating said first environment from the second environment;
   a sampling device suitable for collecting elements present in the atmosphere prevailing within the first environment; and
   a suction device,
   wherein the sampling device comprises a cassette defining a compartment that has a sampling inlet orifice and a connecting outlet orifice that can be connected to the suction device, means for retaining the elements the presence and/or concentration of which is sought being housed in the compartment, interposed between the two orifices, the cassette further including fastening means configured to mount the sampling device on the isolation personal protective equipment, which has complementary fastening means, with the sampling orifice of said sampling device emerging into said isolated first environment, and
   wherein the isolation personal protective equipment is an all-in-one isolation suit protecting against biological and chemical hazards, comprising a respiratory mask portion.

21. The assembly as claimed in claim 9, wherein the sampling inlet orifice of the base has means for fastening to an orifice made in the mask M of the RPE, said orifice made in the mask M of the RPE having complementary fastening means for achieving sealed mounting.

22. The assembly as claimed in claim 14, wherein the sampling device includes elements for closing the connecting outlet orifice and the sampling inlet orifice.

23. The assembly as claimed in claim 14, wherein the compartment of the cassette is sealed.

24. The assembly as claimed in claim 14, wherein that the retention means are selected as a function of the type of elements sought and are selected from filters and sampling tubes, said filters and said sampling tubes including adsorbents selected from the group consisting of activated carbon, black carbon graphite, porous polymer, and silica gels.

25. The assembly as claimed in claim 16, wherein the compartment of the cassette is sealed.

26. The assembly as claimed in claim 16, wherein that the retention means are selected as a function of the type of elements sought and are selected from filters and sampling tubes, said filters and said sampling tubes including adsorbents selected from the group consisting of activated carbon, black carbon graphite, porous polymer, and silica gels.

27. The assembly as claimed in claim 19, wherein the compartment of the cassette is sealed.

28. The assembly as claimed in claim 19, wherein that the retention means are selected as a function of the type of elements sought and are selected from filters and sampling tubes, said filters and said sampling tubes including adsorbents selected from the group consisting of activated carbon, black carbon graphite, porous polymer, and silica gels.

29. The assembly as claimed in claim 20, wherein the compartment of the cassette is sealed.

30. The assembly as claimed in claim 20, wherein that the retention means are selected as a function of the type of elements sought and are selected from filters and sampling tubes, said filters and said sampling tubes including adsorbents selected from the group consisting of activated carbon, black carbon graphite, porous polymer, and silica gels.

* * * * *